US008896665B2

(12) United States Patent
Kim et al.

(10) Patent No.: US 8,896,665 B2
(45) Date of Patent: Nov. 25, 2014

(54) CAMERA CALIBRATION METHOD AND MEDIUM AND 3D OBJECT RECONSTRUCTION METHOD AND MEDIUM USING THE SAME

(75) Inventors: Keun-ho Kim, Yongin-si (KR);
Seok-yoon Jung, Yongin-si (KR);
Shin-jun Lee, Yongin-si (KR);
Gyeong-ja Jang, Yongin-si (KR);
Vladimir Vezhnevets, Moscow (RU);
Anton Konouchine, Moscow (RU)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 2044 days.

(21) Appl. No.: 11/723,532

(22) Filed: Mar. 20, 2007

(65) Prior Publication Data
US 2007/0253618 A1 Nov. 1, 2007

(30) Foreign Application Priority Data
Mar. 20, 2006 (KR) ........................ 10-2006-0025209

(51) Int. Cl.
*H04N 13/02* (2006.01)
*G06K 9/00* (2006.01)
*G06K 9/62* (2006.01)
(52) U.S. Cl.
USPC .............. 348/46; 382/103; 382/154; 382/107
(58) Field of Classification Search
USPC ........................................................ 348/46
See application file for complete search history.

(56) References Cited

U.S. PATENT DOCUMENTS

| | | | |
|---|---|---|---|
| 2001/0030646 A1* | 10/2001 | Hubeli et al. | 345/420 |
| 2003/0012410 A1* | 1/2003 | Navab et al. | 382/103 |
| 2004/0057599 A1* | 3/2004 | Okada et al. | 382/103 |
| 2004/0136567 A1* | 7/2004 | Billinghurst et al. | 382/103 |
| 2004/0240725 A1* | 12/2004 | Xu et al. | 382/154 |
| 2004/0249809 A1* | 12/2004 | Ramani et al. | 707/4 |
| 2005/0025343 A1* | 2/2005 | Zhang et al. | 382/107 |
| 2007/0122027 A1* | 5/2007 | Kunita et al. | 382/154 |

FOREIGN PATENT DOCUMENTS

| | | |
|---|---|---|
| EP | 1355277 | 10/2003 |
| JP | 2001-245323 | 9/2001 |
| JP | 2002-296019 | 10/2002 |
| KR | 10-2005-0007504 | 1/2005 |
| KR | 10-2005-0046763 | 5/2005 |

OTHER PUBLICATIONS

Agin, "Hierarchical Representation of Three-Dimensional Objects Using Verbal Models", IEEE Trans on Pattern Analysis and Machine Intelligence, vol. PAMI-3, No. 2, Mar. 1981.*

(Continued)

*Primary Examiner* — Hee-Yong Kim
(74) *Attorney, Agent, or Firm* — Staas & Halsey LLP

(57) ABSTRACT

A camera calibration method and medium and a 3-dimensional (3D) object reconstruction method and medium using the camera calibration method are provided. The camera calibration method includes setting a feature track by tracking and matching features in an input image sequence; estimating 3-dimensional (3D) points in relation to the features by initializing a structure and motion of the camera; estimating a pose of the camera by using the 3D points and refining the structure of the camera based on the estimated pose; and refining the pose of the camera.

31 Claims, 20 Drawing Sheets
(9 of 20 Drawing Sheet(s) Filed in Color)

(56) References Cited

OTHER PUBLICATIONS

Mokhtarian, "Silhouette-Based Isolated Object Recognition through Curvature Scale Space", IEEE Tran. PAMI, vol. 17, No. 5, pp. 539-544, 1995.*

Hirokazu Yagou et al., "Mesh Smoothing via Mean and Median Filtering Applied to Face Normals", Geometric Modeling and Processing Proceedings, 2002, pp. 1-8.

Marc Pollefeys et al., "Visual modeling with a hand-held camera", International Journal of Computer Vision, vol. 59, Issue 3, Sep.-Oct. 2004, pp. 1-52.

Tiziano Tommasini et al., "Making Good Features Track Better", IEEE Computer Society Conference on Computer Vision and Pattern Recognition, 1998, pp. 1-6.

C. Bradford Barber et al., "The Quickhull Algorithm for Convex Hulls", ACM Transactions on Mathematical Software, vol. 22, No. 4, Dec. 1996, pp. 469-483.

M. Pollefeys et al., "Hand-held acquisition of 3D models with a video camera", Second International Conference on 3-D Digital Imaging and Modeling, 1999, pp. 1-10.

Andrea Fusiello et al., "Improving Feature Tracking with Robust Statistics", Pattern Analysis & Applications, vol. 2, Issue 4, pp. 1-22.

Tomokazu Sato et al., "Dense 3-D Reconstruction of an Outdoor Scene by Hundreds-baseline Stereo Using a Hand-held Video Camera", International Journal of Computer Vision, vol. 47, Issue 1-3, Apr.-Jun. 2002, pp. 1-10.

William A. Hoff, "An Interactive System for Creating Object Models from Range Data based on Simulated Annealing", IEEE International Conference on Robotics and Automation, 1997, pp. 1-6.

Ying-Kin Yu et al., "Recursive 3D Model Reconstruction Based on Kalman Filtering", IEEE Transactions on Systems, Man, and Cybernetics, vol. 35, Issue 3, Jun. 2005, pp. 1-15.

Ying-Kin Yu et al., "A Fast and Robust Simultaneous Pose Tracking and Structure Recovery Algorithm for Augmented Reality Applications", 2004 International Conference on Image Processing, Oct. 2004, pp. 1-4.

Ying-Kin Yu et al., "A Fast Recursive 3D Model Reconstruction Algorithm for Multimedia Applications", Proceedings of the 17th International Conference on Pattern Recognition, Aug. 2004, pp. 1-4.

* cited by examiner

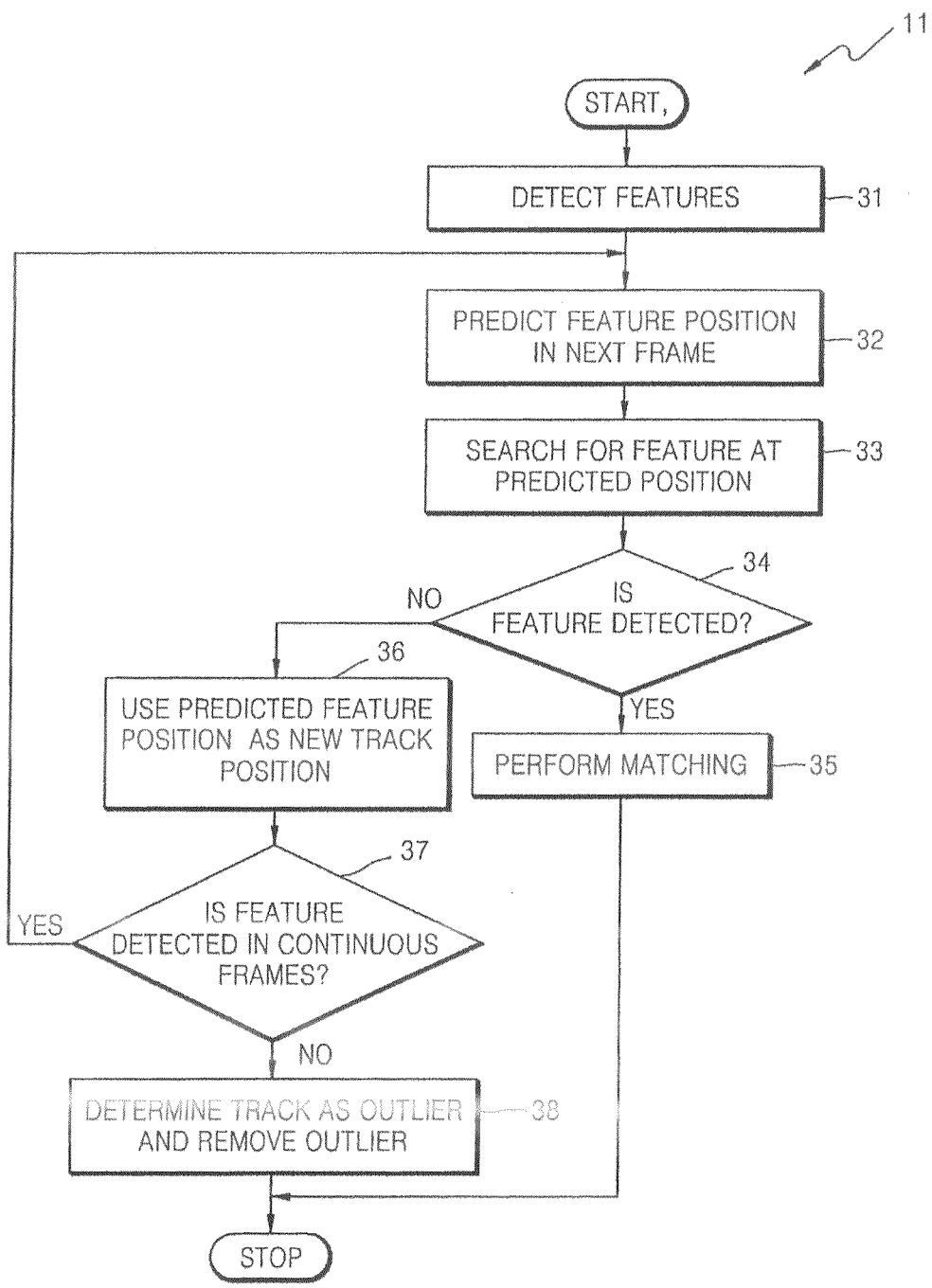

51

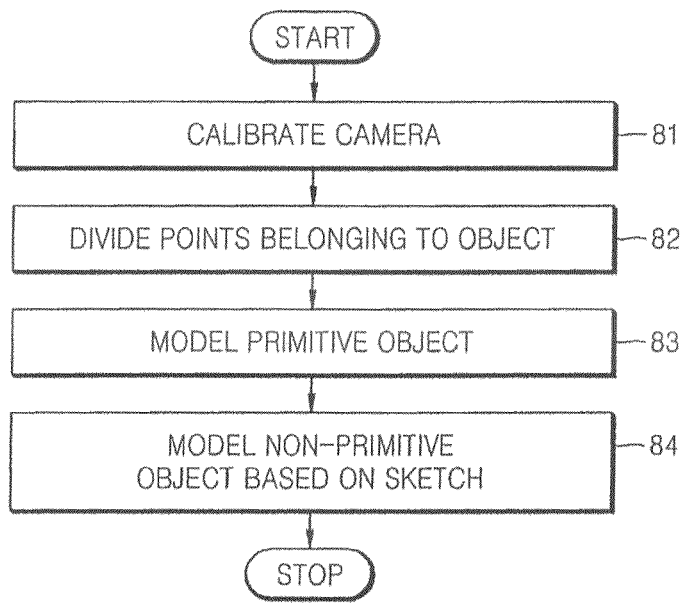
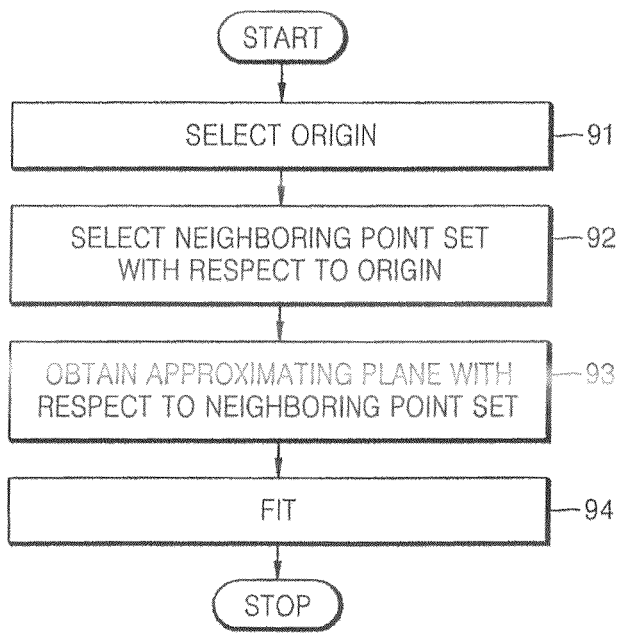

FIG. 12A
FIG. 12B
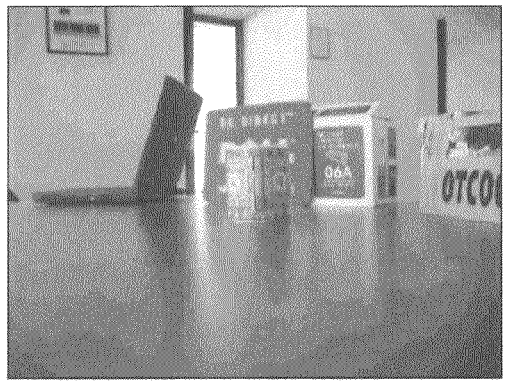

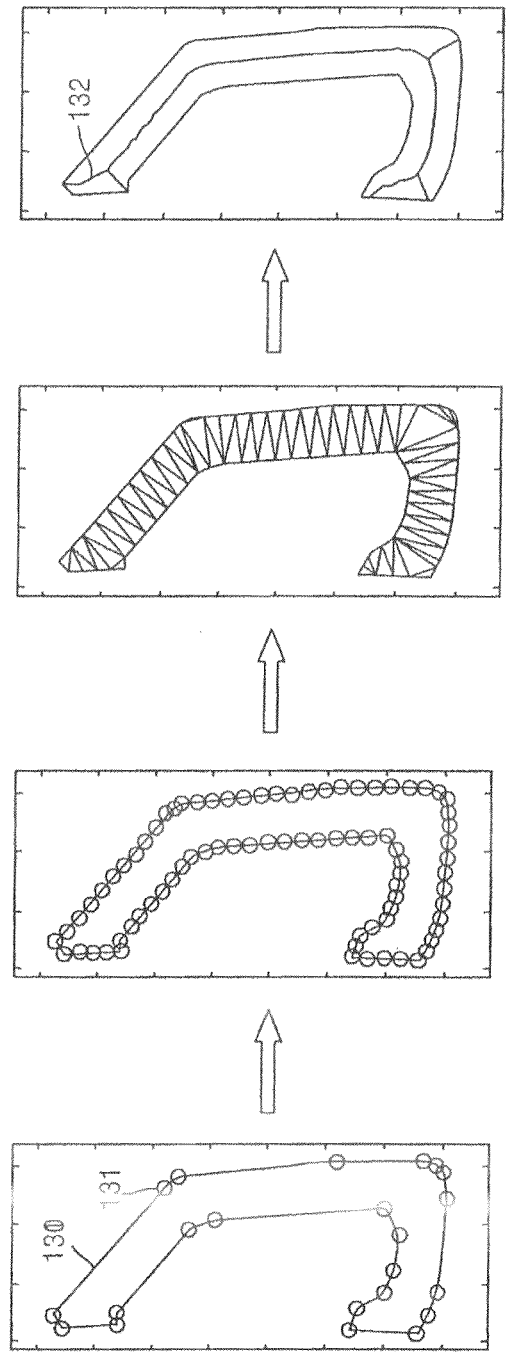

FIG. 20A
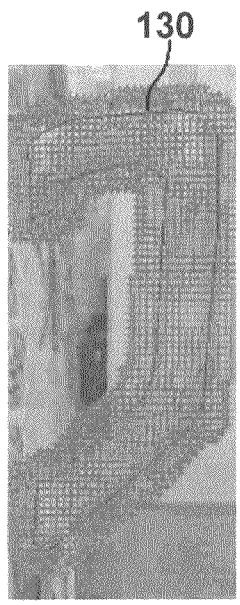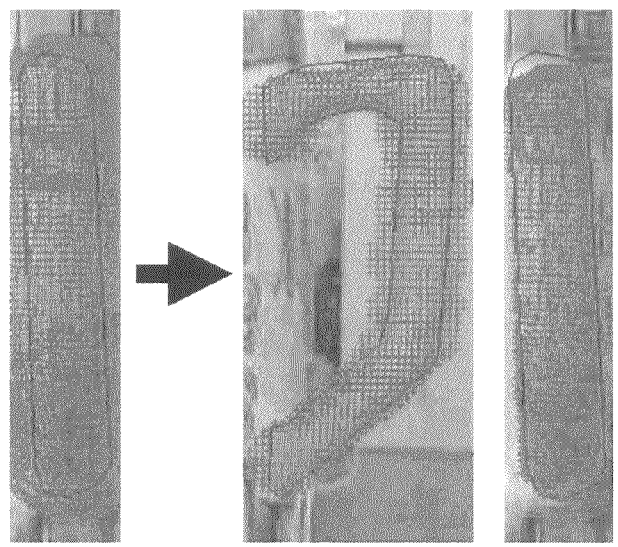
FIG. 20B
FIG. 21
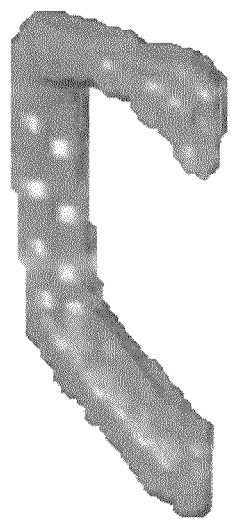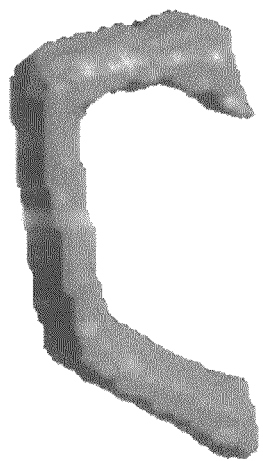

FIG. 22A
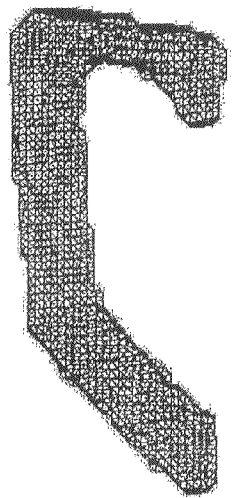
FIG. 22B
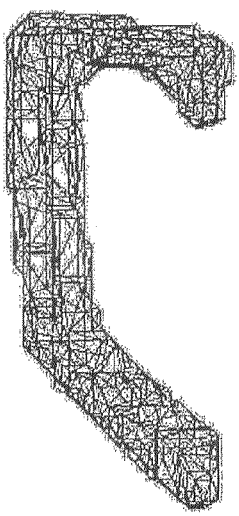
FIG. 23
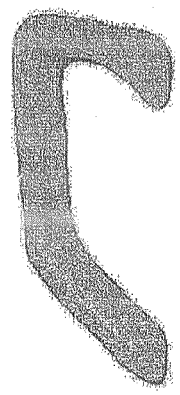
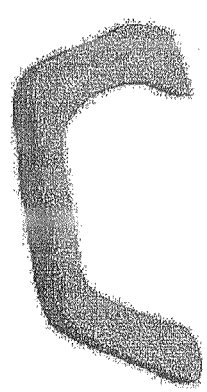

FIG. 25
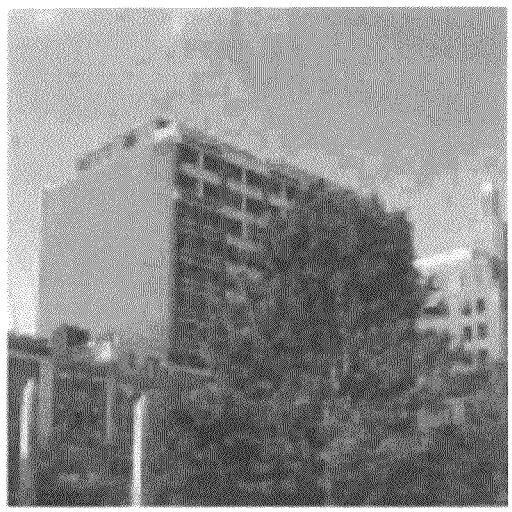
FIG. 26A
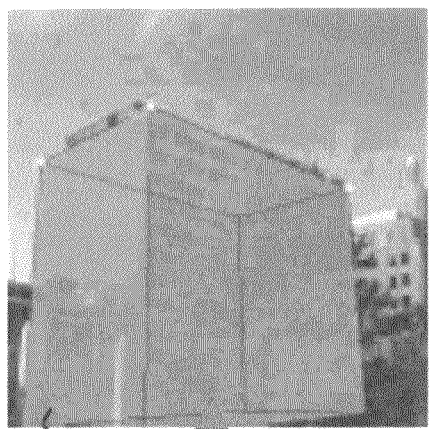
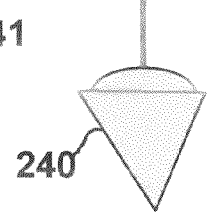
FIG. 26B
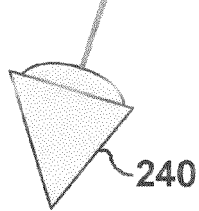

CAMERA CALIBRATION METHOD AND MEDIUM AND 3D OBJECT RECONSTRUCTION METHOD AND MEDIUM USING THE SAME

CROSS-REFERENCE TO RELATED APPLICATIONS

This application claims the benefit of Korean Patent Application No. 10-2006-0025209, filed on Mar. 20, 2006, in the Korean Intellectual Property Office, the disclosure of which is incorporated herein in its entirety by reference.

BACKGROUND

1. Field

One or more embodiments of the present invention relate to a method and medium calibrating a camera and a method and medium reconstructing a 3-dimensional (3D) object using the calibrating method, and more particularly, to a method and medium calibrating a camera using the relations among points in an image without using a calibration tool, and a method and medium reconstructing a 3D object using the calibrating method.

2. Description of the Related Art

With the development of computer technologies, 3-dimensional (3D) expression of an object is increasingly important in a variety of fields. Accordingly, research has been carried out in order to generate a realistic 3D model similar to a photo of the real world. However, despite the research activities, 3D modeling of a complicated object is still a laborious and time-consuming task.

The latest trend in 3D modeling is that a 3D image is reconstructed from 2D pictures. This new paradigm is called image-based modeling, and the prime advantage of this technique is that an image closer to the real world is generated using texture obtained from the real world. In order to obtain 3D information from an image, camera calibration is performed. Camera calibration can be performed with a vision-based method using images obtained solely using a camera. The vision-based method includes a camera calibrating method, which puts a previously known check pattern into the real world and uses an image in which the check pattern is projected.

The camera calibrating method using the check pattern can obtain relatively accurate camera parameters, but has a prerequisite in that a pattern known beforehand should always exist in an image, and at least two surfaces of an object that is desired to be reconstructed should exist in the image.

Accordingly, a method of calibrating a camera without a calibrating tool is needed.

SUMMARY

One or more embodiments of the present invention provide a method by which a camera is calibrated using feature points in an image without a calibration tool, and by using the accordingly obtained parameters, a 3-dimensional (3D) object may be reconstructed.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a method of calibrating a camera. The method includes setting a feature track by tracking and matching features in an input image sequence, estimating 3-dimensional (3D) points in relation to the features by initializing a structure and motion of the camera, estimating a pose of the camera using the 3D points and refining the structure of the camera based on the estimated pose, and refining the pose of the camera.

To achieve at least the above and/or other aspects and advantages, embodiments of the present invention include a method of reconstructing a 3-dimensional (3D) object. The method includes calibrating a camera using feature points in an input image sequence and obtaining 3D points with respect to the input image sequence, obtaining an outermost surface with respect to an object from two frames among input images, and dividing 3D points belonging to the outermost surface from the 3D points, modeling primitive objects included in the input images from the divided 3D points, and receiving outline information on non-primitive objects through user interaction, and modeling the non-primitive objects from the input images.

To achieve at least the above and/or other aspects and advantages, embodiments of the present invention include a method of reconstructing a non-primitive 3-dimensional (3D) object. The method includes receiving outline points of a silhouette of the non-primitive object desired to be modeled in an input image sequence, extracting 2-dimensional (2D) skeletons with respect to the silhouette by using triangulation based on the received outline points, obtaining an outermost surface of a 3D object from the 2D skeletons and constructing a 3D skeleton by calculating 3D sections from the outermost surface, generating a volume model by performing a transform of the 3D skeleton into a voxel space, and constructing a 3D polygon model by performing the transform inversely for the volume model.

To achieve at least the above and/or other aspects and advantages, embodiments of the present invention include a method of reconstructing a 3-dimensional (3D) object at a roadside, including arranging a primitive frame with respect to an identical and primitive object in two images of the roadside viewed from different camera orientations, respectively, extracting feature points with respect to the primitive frame, calibrating the camera using the feature points and obtaining 3D points for the images, modeling the primitive object from the 3D points, and receiving outline information of a non-primitive object through user interaction and modeling the non-primitive object from the images.

To achieve at least the above and/or other aspects and advantages, embodiments of the present invention include at least one medium including computer readable code to control at least one processing element in a computer to implement a method of calibrating a camera. The method includes setting a feature track by tracking and matching features in an input image sequence, estimating 3-dimensional (3D) points in relation to the features by initializing a structure and motion of the camera, estimating a pose of the camera using 3D points and refining the structure of the camera based on the estimated pose, and refining the pose of the camera.

To achieve at least the above and/or other aspects and advantages, embodiments of the present invention include at least one medium including computer readable code to control at least one processing element in a computer to implement a method of reconstructing a 3-dimensional (3D) object. The method includes calibrating a camera using feature points in an input image sequence and obtaining 3D points with respect to the input image sequence, obtaining an outermost surface with respect to an object from two frames among input images, and dividing 3D points belonging to the outermost surface from the 3D points, modeling primitive objects included in the input images from the divided 3D points, and receiving outline information on a non-primitive objects through user interaction, and modeling the non-primitive objects from the input images.

To achieve at least the above and/or other aspects and advantages, embodiments of the present invention include at least one medium including computer readable code to control at least one processing element in a computer to implement a method of reconstructing a non-primitive 3-dimensional (3D) object. The method includes receiving outline points of a silhouette of the non-primitive object desired to be modeled in an input image sequence, extracting 2-dimensional (2D) skeletons with respect to the silhouette by using triangulation based on the received outline points, obtaining an outermost surface of a 3D object from the 2D skeletons and constructing a 3D skeleton by calculating 3D sections from the outermost surface, generating a volume model by performing a transform of the 3D skeleton into a voxel space, and constructing a 3D polygon model by performing the transform inversely for the volume model.

To achieve at least the above and/or other aspects and advantages, embodiments of the present invention include at least one medium including computer readable code to control at least one processing element in a computer to implement a method of reconstructing a 3-dimensional (3D) object at a roadside. The method includes arranging a primitive frame with respect to an identical and primitive object in two images of the roadside viewed from different camera orientations, respectively, extracting feature points with respect to the primitive frame, calibrating the camera using the feature points and obtaining 3D points for the images, modeling the primitive object from the 3D points, and receiving outline information of a non-primitive object through user interaction and modeling the non-primitive object from the images.

To achieve at least the above and/or other aspects and advantages, embodiments of the present invention include a camera calibration method including detecting one or more feature points from each of a plurality of consecutive images, and matching each of the feature points detected from the plurality of consecutive images.

BRIEF DESCRIPTION OF THE DRAWINGS

The patent or application file contains at least one drawing executed in color. Copies of this patent or patent application publication with color drawings will be provided by the Office upon request and payment of the necessary fee. These and/or other aspects and advantages of the invention will become apparent and more readily appreciated from the following description of the embodiments, taken in conjunction with the accompanying drawings of which:

FIG. 3 is a detailed flowchart illustrating a method of tracking and matching features, according to an embodiment of the present invention;

FIG. 8 is a flowchart illustrating a method of reconstructing a 3-dimensional (3D) image, according to an embodiment of the present invention;

FIG. 9 is a flowchart illustrating a method of modeling a primitive object from 3D points according to operation 83 illustrated in FIG. 8;

FIGS. 12A and 12B illustrate the silhouette of the handle of a cup in an image, according to an embodiment of the present invention;

FIG. 13A illustrates major points selected in a silhouette of a handle, according to an embodiment of the present invention;

FIG. 13B illustrates connection of the major points illustrated in FIG. 13A;

FIG. 13C illustrates formation of a triangular model, according to an embodiment of the present invention;

FIG. 13D illustrates edges obtained inside a polygon illustrated in FIG. 13C;

FIG. 20A illustrates a volume surface extending over a silhouette;

FIG. 20B illustrates a volume model in which part of a volume surface extending over a silhouette is cut off to fit the silhouette;

FIG. 21 illustrates a result obtained through corrections illustrated in FIG. 20B;

FIG. 22A illustrates a polygon model;

FIG. 22B illustrates a polygon model in which the number of triangles is reduced illustrated in FIG. 22A;

FIG. 23 illustrates a model obtained by iteratively applying a Laplacian flow mesh filter to the polygon model illustrated in FIG. 22B;

FIG. 25 illustrates an example of a roadside building scene; and

FIGS. 26A and 26B illustrate scenes of different views according to the orientation of a camera.

DETAILED DESCRIPTION OF EMBODIMENTS

Figure 1:
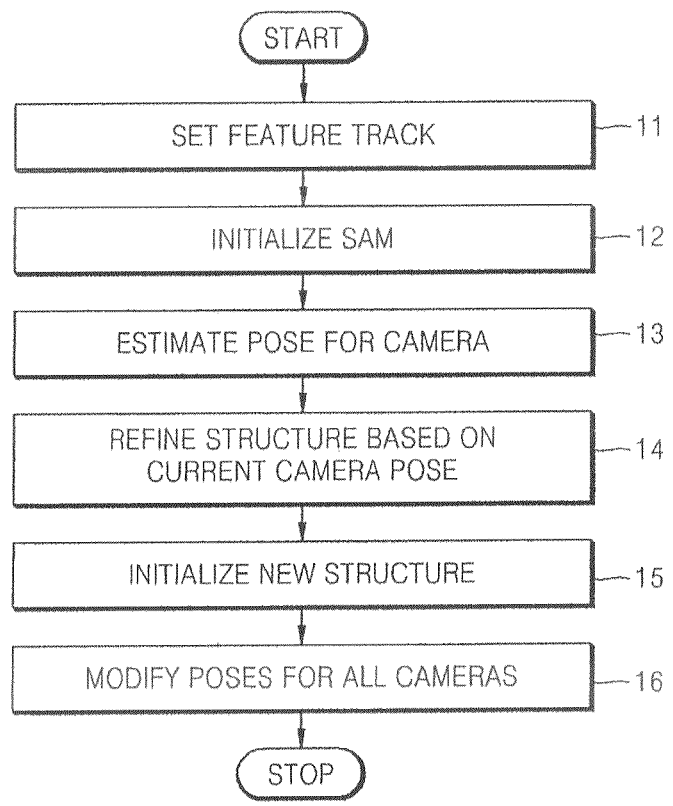
FIG. 1 is a flowchart illustrating a camera calibration method according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 is a flowchart illustrating a camera calibration method, according to an embodiment of the present invention.

First, a track corresponding to features in an obtained image may be generated in operation 11. The features track may be formed by extracting features from an input image sequence, tracking positions of the identical features from sequential input images and matching corresponding features between neighboring frames. A process of forming the track will now be explained in more detail.

Figure 2A:
FIG. 2A illustrates one of the images continuously shot by a camera, according to an embodiment of the present invention.
Figure 2B:
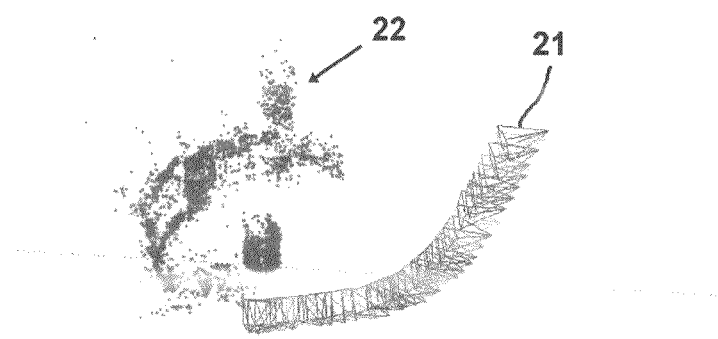
FIG. 2B illustrates feature points of objects included in images obtained by motions of a camera, according to an embodiment of the present invention.

FIG. 2A illustrates one of the images sequentially shot by a camera, and FIG. 2B illustrates feature points of objects included in images obtained according to the motions of the camera. In FIG. 2B, reference number 21 indicates a camera and reference number 22 indicates feature points.

FIG. 3 is a flowchart illustrating a method of tracking and matching features, according to an embodiment of the present invention. Features are detected from a current frame and the next frame, in operation 31. The detection of features may be performed using, e.g., a known Harris corner detector or other detection techniques. A Harris corner detector is generally used to find corner points by detecting points whose corner responses for pixel values are greater than a threshold. The detected corner points may become feature points of one or more embodiments of the present invention.

In operation 32, when a feature point is selected in the current frame for feature point tracking, a next feature point in the next frame may be predicted by locating the next feature point at a position corresponding to the position of the selected feature point in the current frame.

Figure 4:
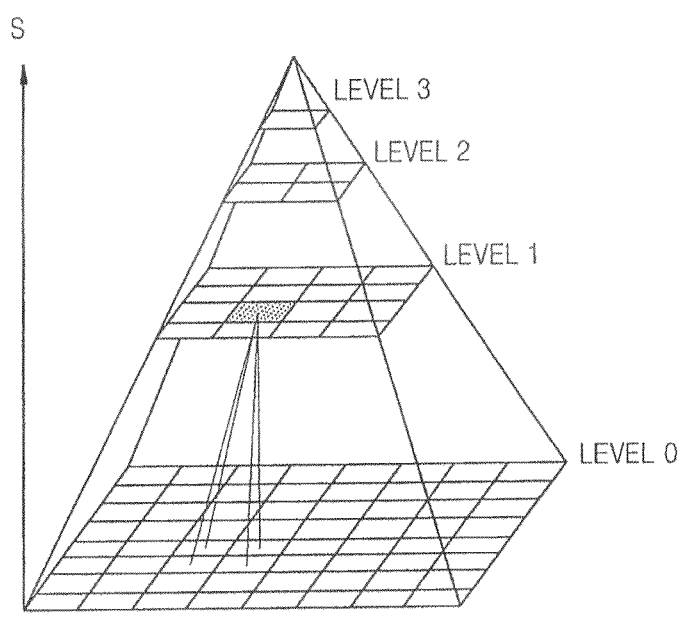
FIG. 4 is a diagram illustrating a structure of an image having hierarchical resolutions for pyramidal tracking, according to an embodiment of the present invention.

In an embodiment, the prediction of feature points may be performed hierarchically in a pyramidal tracking form as illustrated in FIG. 4. Referring to FIG. 4, each level of the pyramid has a different resolution for a frame. The prediction of feature points begins from a lowest resolution level, e.g., level 3, moves gradually to higher resolutions level, one level at a time, and is performed iteratively. That is, a feature point searched in a lower resolution level may be used to predict a feature point in a higher resolution level. Here, the number of levels and the differences between resolutions of respective levels may be determined experimentally.

The predicted feature point position may be modified by reflecting the difference between the current frame and the next frame. That is, the difference between a window centering at the feature point of the current frame and a window centering at the predicted feature point in the next frame may be calculated and the predicted feature point position may be shifted to be modified in the gradient direction between the current frame and the next frame, according to the calculated difference. The modified position of the predicted feature point 5 may be determined according to a rotational matrix D and a translation d in the gradient direction with respect to the predicted position x of the feature point, as defined by equation 1.

$$\delta = Dx + d \quad \text{Equation 1}$$

$$D = \begin{bmatrix} \cos\theta & -\sin\theta \\ \sin\theta & \cos\theta \end{bmatrix}$$

wherein d denotes a translation parameter vector and θ denotes a rotation angle. Next, corresponding features in the next frame may be detected by searching a window centering at the modified position of the feature point in operation 33. The bigger the window, the more time it takes to search the feature points and the more outliers, thus it becomes difficult to perform robust prediction. The smaller the window, the more difficult it is to ensure the window includes the corresponding points. Accordingly, the size of the window may be determined experimentally.

If features are detected in operation 34, the detected features may be matched with the features of the current frame in operation 35. The matching may be performed as follows. First, the corresponding relations between the feature points of the current frame and the detected features may be calculated respectively. The corresponding relation may be calculated through a known metric, such as a sum of square distance (SSD) or a cross-correlation. Among the detected features, the features having the calculated values exceeding a predetermined threshold may be selected as similar features. By performing the 2-view relation estimation for the selected features and the feature points of the current frame, a most similar feature may be selected. Here, the 2-view relation estimation indicates to calculate projectivity of the window centering at the feature point of the current frame to a window centering at each selected feature in the next frame, or a fundamental matrix.

If a feature point is not detected in operation 34, the position predicted in operation 32 may be set as a new track position of the next frame corresponding to the feature point of the current frame in operation 36.

Also, if a feature point in relation to the track of each feature point is not detected, for example, in five continuous frames, in operation 37, the track may be determined to be an outlier and then removed in operation 38.

Figure 5A:
FIG. 5A is a diagram illustrating feature point tracks in an image, according to a conventional Lucas-Kanade-Tomasi (LKT) method.
Figure 5B:
FIG. 5B is a diagram illustrating feature point tracks, according to an embodiment of the present invention.

FIG. 5A illustrates tracks of feature points in an image according to a conventional Lucas-Kanade-Tomasi (LKT) method. FIG. 5B illustrates tracks of feature points according to an embodiment of the present invention. In FIG. 5A, reference number 51 indicates a plurality of outliers.

Referring to FIGS. 5A and 5B, in conventional feature point tracking, when the position of a camera changes and in turn the angle or position of an object changes, feature points generally become weaker and disappear. Thus outliers occur. However, in the feature point tracking according to the current embodiment, the continuity of features in the next frame may be predicted and feature matching may be performed using correlations between the features. Thus outliers may be removed.

In operation 11 illustrated in FIG. 1, if the features track is set, the structure and motion (SAM) of the camera is estimated in operations 12 through 16. Data input for the SAM estimation may be the image sequence obtained from the camera and an intrinsic calibration parameter K of the camera. The camera intrinsic calibration parameter K may be expressed as an intrinsic calibration matrix as in equation 2.

$$K = \begin{bmatrix} f_x & 0 & c_x \\ 0 & f_y & c_y \\ 0 & 0 & 1 \end{bmatrix} \quad \text{Equation 2}$$

Here, $f_x$ and $f_y$ are focal lengths of the camera and $c_x$ and $c_y$ indicate the position of the principal point of the camera.

The results of estimating the SAM from the data are the pose of the camera determined by the rotation and position of the camera in a world coordinate system, that is, the camera's extrinsic calibration matrix C(k) (k=1, ..., N, N is the number of input images), a structure expressed by 3D points D(i), and feature tracks corresponding to the structure point D(i), where $$C(k) = \begin{bmatrix} R^T & -R^T t \\ \tilde{0}_3 & 1 \end{bmatrix},$$

R denotes rotation of the camera in the world coordinate system and t is the position of the camera in the world coordinate system.

Figure 6:
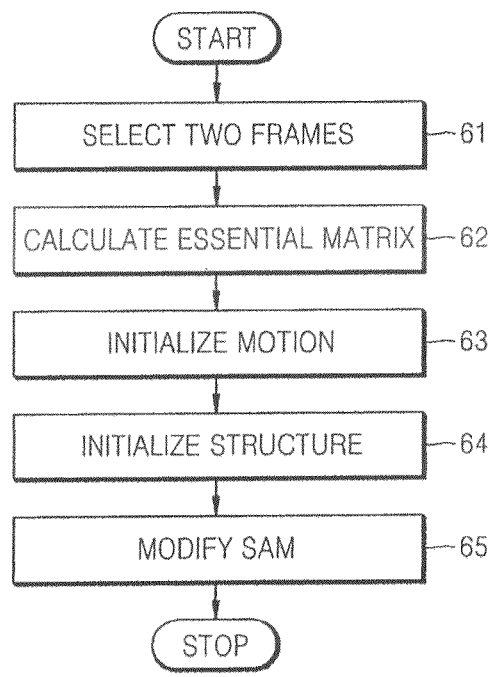
FIG. 6 is a flowchart illustrating a structure and motion (SAM) initialization method, according to an embodiment of the present invention.

In order to perform SAM estimation, the SAM may be initialized in operation 12. FIG. 6 is a flowchart illustrating a SAM initialization method.

First, two frames may be selected from continuous images in operation 61. In order to select the two frames, a median error of a feature point position predicted by homography may be used. The homography may indicate correspondence between images, and may predict a feature point position when a camera is rotated or a scene is planar. The median error by the homography prediction may be referred to as an image-based distance (IBD).

From N pairs of frames, the product of the number of matched features between frames and an IBD is obtained as in equation 3 below, and a pair of frames having the biggest value from the products may be selected as the two frames for SAM initialization.

$$\underset{i}{\text{median}} \|Hx_i^1, x_i^2\| * n \quad \text{Equation 3}$$

Here, H is the homography estimated between two frames, and n is the number of matched features between the two frames, and i=[1, N].

If the two frames are selected for SAM initialization, a fundamental matrix F obtained from the feature tracks of the two frames, and an essential matrix Q obtained from the camera intrinsic calibration matrix K may be calculated as in equation 4 in operation 62.

$$F = K_2^{-T} \times Q \times K_1^{-1} \quad \text{Equation 4:}$$

Here, $K_1$ and $K_2$ may indicate the intrinsic calibration matrices of a first camera and a second camera, respectively, and T may indicate a transpose.

The essential matrix Q may indicate relative motion between two cameras. This relative motion may be obtained from the essential matrix Q expressed as equation 5 in operation 63.

$$Q = R \times \begin{bmatrix} 0 & -t_z & t_y \\ t_z & 0 & -t_x \\ -t_y & t_x & 0 \end{bmatrix} \quad \text{Equation 5}$$

Here, R is the rotation of the second camera with respect to the first camera and T is the position of the second camera with respect to the first camera, and $T=[t_x,t_y,t_z]$.

In equation 5, R and T, that is, the values indicating camera motion, may be obtained through singular value decomposition with respect to the essential matrix Q.

If the motion of the camera is initialized, the structure may be initialized by estimating 3D points through triangulation of matched features that may be determined to be essential inliers in operation 64.

If the motion and structure are initialized, a reprojection error of an object may increase. Accordingly, the SAM should be modified again in operation 65. In the modification of the SAM, the pose of the second camera may again be estimated using the current structure and the structure may again be estimated using the re-estimated pose of the second camera. The modification of the SAM may be repeated until the re-estimated values become settled. If the SAM modification is completed, the re-projection error of the object may be reduced to 0.2 to 0.25 pixels, for example.

If SAM initialization is completed, continuous SAM estimation may be performed in operation 13 and 14. First, the pose of a camera may be estimated in operation 13. The pose of the camera generally denotes the position and orientation of the camera. The orientation of the camera may be expressed by, for example, a roll angle, a pitch angle and a yaw angle. The pose of the camera may be obtained from a matrix projecting 3D points onto the camera, e.g., an affine transform.

If the SAM is initialized, 3D points and 2D feature tracks may be obtained. These 2D-3D correspondences may become input data for estimating extrinsic calibration parameters of the camera with respect to each frame.

Feature positions may be obtained from the projection of 3D points and thus may include errors. Also, even after outliers are removed, outliers may exist in a feature track. Accordingly, estimation of a pose should be robust and reliable even when noise exists.

From the distances between feature points obtained from an image and re-projected points when the 3D points obtained from the SAM initialization are re-projected on a 2D plane using a camera projection matrix, the quality of the pose may be evaluated through a distance function f(P) expressed as in equation 6. Accordingly, by obtaining the camera projection matrix minimizing f(P), the pose of the camera may be estimated.

$$f(P) = \sum_{i=1}^{n} p(D^2(m_i, PM_i)) \quad \text{Equation 6}$$

Here, D is a distance, $m_i$ is a 2D feature point, $M_i$ is a 3D point obtained in the SAM initialization, and P is a camera projection matrix.

In equation 6, $p(D^2)$ can be expressed as equation 7 below.

$$\sum p(D^2) = \sum w_i (x_i - \hat{\tilde{x}}_i)^2 \qquad \text{Equation 7}$$

Here, $x_i$ is a 2D feature point, $\hat{\tilde{X}}_i$ is a projection of a 3D point, and $w_i$ is a weight.

The weight $w_i$ in equation 7 can be determined according to equation 8 below.

$$w = \min(a, \pi/2) * \log(n), \ a = \begin{cases} a, \ a <= \pi/2 \\ \pi/2 - a, \ a > \pi/2 \end{cases} \qquad \text{Equation 8}$$

Here, a is an angle between a line connecting the center of the camera to a 3D point and the center line of the camera and n is the number of cameras.

Triangulation is generally best performed when a 3D point is viewed from two cameras so that rays from the centers of the two cameras to the 3D point can intersect perpendicularly. Also, the accuracy of the 3D points may be affected by the number of cameras used for reconstruction. Accordingly, the weight $w_i$ of equation 8 may be determined by reflecting an angle between the center of each camera and a 3D point and the number of cameras used for the reconstruction.

Figure 7A:
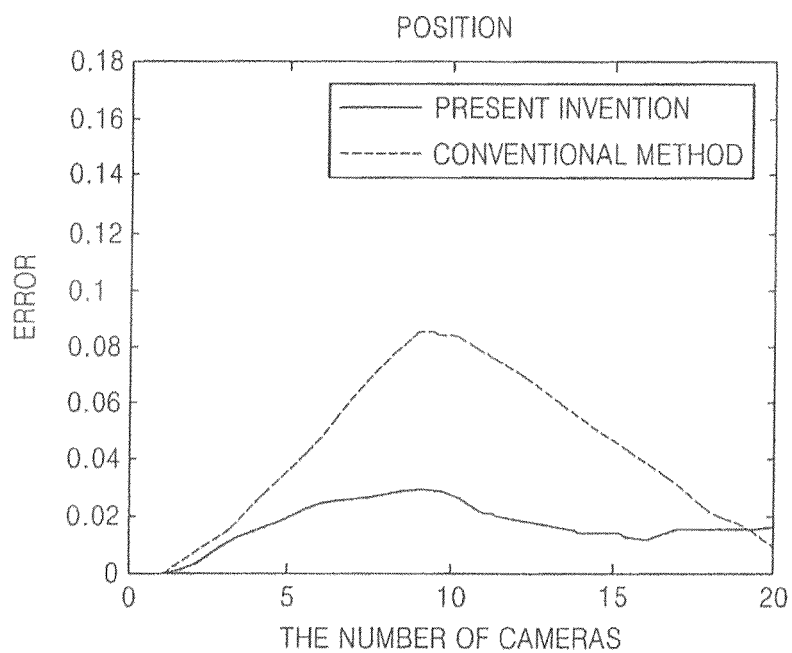
FIG. 7A is a graph illustrating a comparison of camera position errors by the conventional technology with those according to an embodiment of the present invention.
Figure 7B:
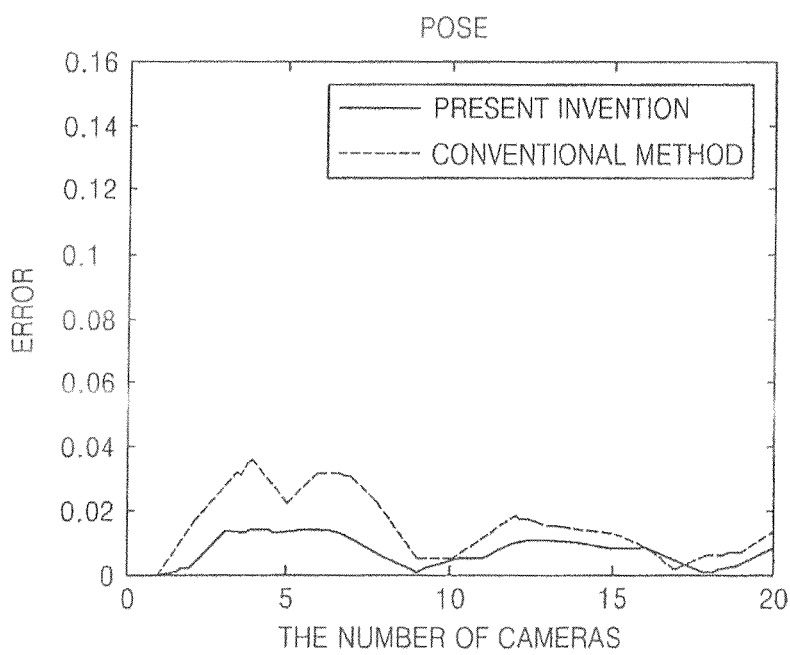
FIG. 7B is a graph illustrating a comparison of camera orientation errors by the conventional technology with those according to an embodiment of the present invention.

FIG. 7A is a graph illustrating comparison of camera position errors by conventional technology with those according to an embodiment of the present invention, and FIG. 7B is a graph illustrating comparison of camera orientation errors by conventional technology with those according to an embodiment of the present invention.

Referring to FIGS. 7A and 7B, an embodiment of the present invention may obtain errors according to equation 7 employing the weight of equation 8, and the conventional technology obtains errors according to equation 7 without employing a weight. As shown in FIGS. 7A and 7B, it can be seen that the errors of an embodiment of the present invention are less than the errors of the conventional technology.

If the estimation of the pose of the camera is finished, the structure may be refined based on the estimated pose of the camera in operation 14. The refinement of the structure may be performed by estimating a multi-view structure, for example. More specifically, a 3D point may be estimated by extracting a feature track from the image sequence. In general, triangulation may be performed using two points projected on two refined images. Since a feature position may be estimated with an error included in a feature tracking process, a 3D point position corresponding to the feature point may also be estimated with an error included. Accordingly, since errors of the feature position estimated from different frames, respectively, may be treated independently, the accuracy of the 3D point position may be refined by projecting the 3D point to another frame.

In a scene, some parts may be seen only from a limited number of frames in the input image sequence. Accordingly, since those parts may not be seen in the frames used for the structure initialization, the points belonging to those parts should be initialized during the continuous SAM estimation process in operation 15. That is, points that are not seen in the images used for the SAM initialization may be estimated later. For this, a feature track, which begins at one of the previous frames for which a 3D point does not start at that previous frame, may be searched in each frame. For point triangulation, a typical structure initialization algorithm may be used.

Through the continuous SAM estimation process, 3D points used for the pose estimation may be modified through several structure refinements, and as a result, the reprojection errors in all frames increase. In the current embodiment, in order to reduce the re-projection errors, 2D-3D matching sets expressed as inliers during the pose estimation process may be stored and the pose may again be estimated with respect to the stored 2D-3D matching sets in operation 16.

The data output in this camera calibration process may be 3D points obtained from the image and intrinsic and extrinsic camera calibration information. By using the data, a 3D image may be reconstructed. FIG. 8 is a flowchart illustrating a method of reconstructing a 3D image according to an embodiment of the present invention.

In order to reconstruct the 3D image, a camera may be calibrated in operation 81. The calibration of the camera may be performed without a calibration tool as illustrated in FIG. 1 or by using a calibration tool such as the conventional checker board, for example.

Once the calibration of the camera is finished, an object may be modeled in operations 82 and 84. A process of modeling an object will now be explained in greater detail.

First, points belonging to an object may be divided from the 3D points obtained as the result of the camera calibration in operation 82. That is, the 3D points may be divided into the points belonging to the object and points belonging to the background. For the division, a conventional image editor tool may be used so that a quadrangle is set in two frames obtained from cameras having different viewing angles, respectively. A viewing cone may be generated by projecting rays from each camera viewpoint, so that the rays may pass through the set quadrangle, and a visual hull may be generated by intersecting the viewing cone. Then, points belonging to the visual hull among the 3D points may be divided as the points belonging to the object. Here, the visual hull may be the largest volume formed with silhouette images and may be an outermost surface of the object, e.g., the upper bound surface.

If the division is performed, a primitive object, such as a cylinder or a hexahedron, may be modeled from the points belonging to the object in operation 83 and a non-primitive object may be modeled through sketch-based editing in operation 84.

FIG. 9 is a flowchart illustrating a method of modeling a primitive object from 3D points according to operation 83 of the method illustrated in FIG. 8. Here, the primitive object may be an object having a predetermined shape, such as a cylinder and a cubic. If a primitive object is extracted, a user may transform the extracted primitive object to fit the individual characteristics of the object.

The data of modeling the primitive object may be a point cloud divided into the points belonging to the object in operation 82. This point cloud may include noise and outliers. An object extraction may involve finding a solution minimizing an error measure, and after an initial solution is obtained, the initial solution may be optimized in order to find an accurate solution.

The initial solution may include the axis, height, and radius of the cylinder.

If the axis of the cylinder is found, the height and radius may be easily estimated. For example, the height and radius may be obtained by transforming the coordinates of the point cloud into the coordinates of the cylinder, e.g., the tangent and normal components.

In order to find the axis of the cylinder, a method of finding the axis of a rotational solid may be used. That is, if a normal vector at an arbitrary point on an outer surface of the solid is considered, the axis of the solid may intersect with the normal vector.

However, since the normal vector cannot be found directly from the point cloud, the normal vector may be estimated according to the method illustrated in FIG. 9. According to the flowchart illustrated in FIG. 9, first, one among the 3D points of the point cloud may be selected as the origin in operation 91. In a predetermined range centering at the origin, a set of neighboring points may be selected in operation 92. In an embodiment, the neighboring point set lies within a distance d (>0) from the origin, and includes N 3D points closest to the origin.

Next, an approximating plane corresponding to the neighboring point set may be found in operation 93. For this, a neighboring quality measure may be calculated by employing a robust model parameter estimation method, such as an M-estimator Sampling Consensus (MSAC). If the neighboring quality measure is greater than a threshold, a normal vector of the approximating plane may be obtained. By using the normal vectors obtained by repeatedly performing operations 91 through 93, the axis, height and radius of the cylinder, for example, may be obtained as described above.

Figure 10:
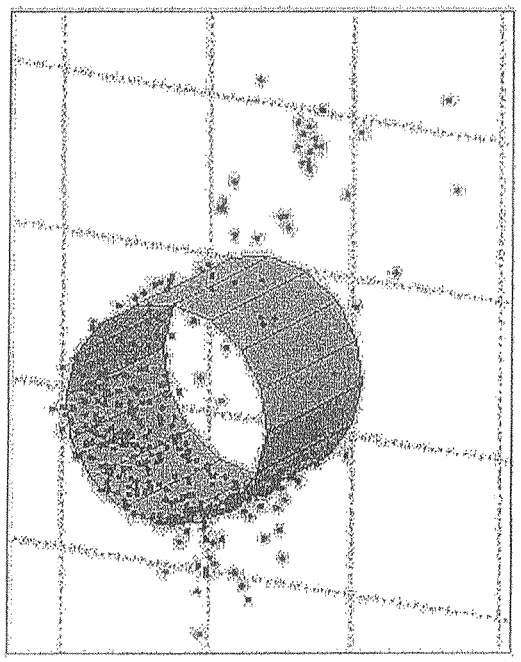
FIG. 10 is a diagram illustrating initial estimation of a cylinder obtained by iteratively performing operations 91 through 93 of the method illustrated in FIG. 9.

FIG. 10 illustrates an exemplified initial estimation of a cylinder obtained by iteratively performing operations 91 through 93 of the method illustrated in FIG. 9.

As illustrated in FIG. 10, if the initial estimation of the cylinder is completed, the 3D points may be fitted with respect to the initial estimation in operation 94. The 3D points may be fitted by, e.g., non-linear least square optimization. In order to minimize the effect of outliers to the fitting of the 3D points, in an embodiment, Huber's m-estimator as defined by equation 9 may be applied to the 3D points and the fitting is performed for the 3D points satisfying equation 9.

$$err(p) = \begin{cases} \rho(\text{cylinder}, p), & \rho(\text{cylinder}, p) < \Delta \\ \Delta, & \text{else} \end{cases} \quad \text{Equation 9}$$

Here, p(cylinder, p) is a function with respect to the distance between a point forming the cylinder and a neighboring point p, and $\Delta$ is a threshold.

If the primitive object is a hexahedron, the hexahedron may be reconstructed from the point cloud by using a generic plane fitting method.

Figure 11:
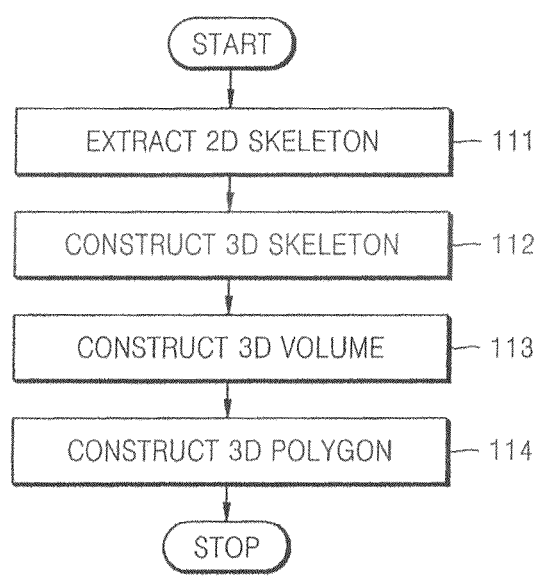
FIG. 11 is a flowchart illustrating a method of modeling a non-primitive object according to operation 84 of the method illustrated in FIG. 8.

FIG. 11 is a flowchart illustrating a method of modeling a non-primitive object according to operation 84 of the method illustrated in FIG. 8. First, a 2D skeleton may be extracted from two images through user interaction (UI) in operation 111. For this, as an example, a case in which the handle of a cup, as in images illustrated in FIGS. 12A and 12B, is reconstructed will now be explained.

Figure 14A:
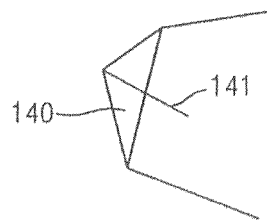
FIGS. 14A through 14C illustrate an exemplified terminal edge, intermediate edge and junction edge, respectively.
Figure 14B:
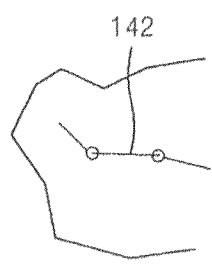
Figure 14C:
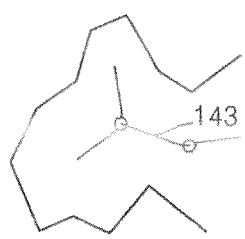

First, through UI, major points 131 for the silhouette 130 of the handle of the cup, as illustrated in FIG. 13A, may be selected. Here, the major points 131 may be parts where the shape of the silhouette 130 of the handle of the cup change, e.g., inflection points of the silhouette 130 of the handle of the cup as illustrated in FIG. 13A. If the major points 131 are selected, UI may connect the selected major points 131 with each other as illustrated in FIG. 13B. With respect to the inside of the connected major points 131, a triangle model may be completed as illustrated in FIG. 13C according to Delaunay triangulation, for example. Then, according to a Voronoi diagram, for example, edges 132 inside a polygon may be obtained as illustrated in FIG. 13D. The obtained edges 132 may be classified as one of the edges illustrated in FIGS. 14A through 14C. FIG. 14A illustrates a terminal edge 141 positioned at a terminal triangle, FIG. 14B illustrates an intermediate edge 142 having two neighboring edges, and FIG. 14C illustrates a junction edge 143 having two or more neighboring edges.

Figure 15:
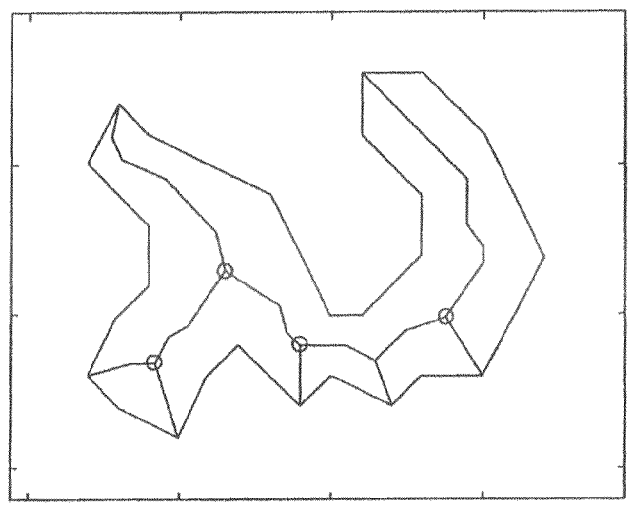
FIG. 15 illustrates a coherent skeleton part.

Next, as illustrated in FIG. 15, a path connecting from a terminal edge to a junction edge or to another terminal edge through intermediate edges may be generated and thus coherent skeleton parts may be generated.

Figure 16A:
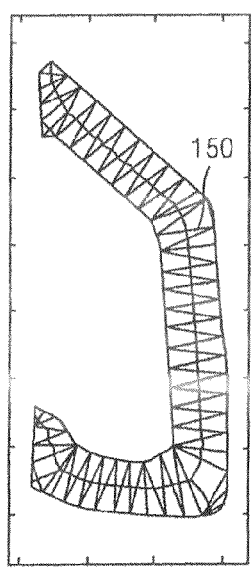
FIG. 16A illustrates a silhouette having sectional edges.
Figure 16B:
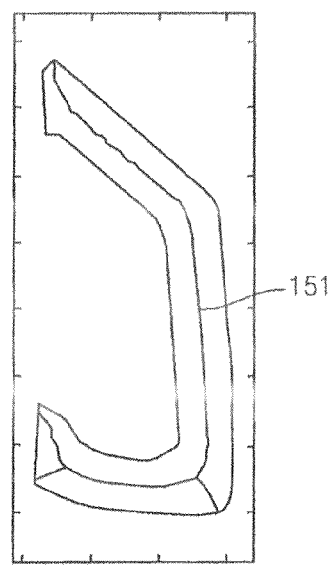
FIG. 16B illustrates a 2D skeleton.

Then, by sorting terminal triangles and sweeping sections, a silhouette having cross-section edges 150 as illustrated in FIG. 16A may be obtained, and by connecting intermediate points of the cross-section edges, a 2D skeleton 151 as illustrated in FIG. 16B may be extracted.

If the 2D skeleton is extracted, a 3D skeleton may be constructed from the 2D skeleton in operation 112 of the method illustrated in FIG. 11. In order to construct the 3D skeleton, the intersections of the visual hull with respect to a plurality of extracted 2D skeletons may be generated. Each of the extracted 2D skeletons may be a set of line edges. Since the visual hull of edges is the internal area of a solid angle, the problem of constructing a 3D skeleton from a plurality of 2D skeletons may be the same as a problem of the intersection of two solid angles. That is, the 3D skeleton may be constructed by intersecting visual hulls of the two 2D skeletons.

Figure 17A:
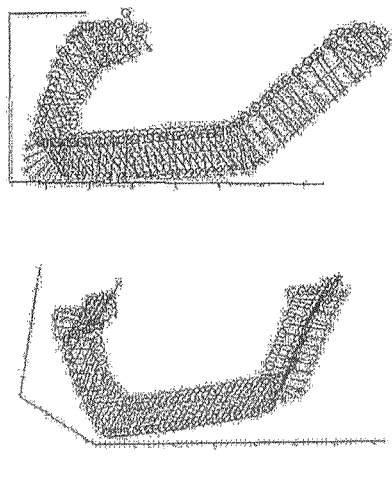
FIGS. 17A and 17B illustrate 3D sections.
Figure 17B:
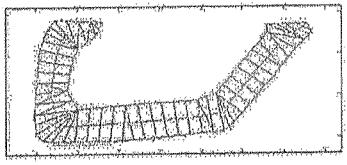
Figure 17C:
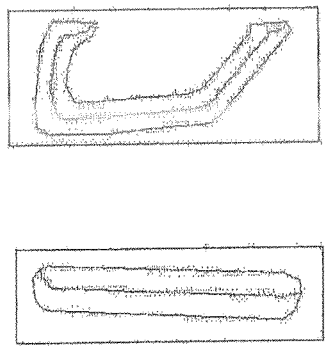
FIG. 17C illustrate a 3D skeleton having 3D sections calculated in different camera positions.

Next, a 3D section may be calculated from a silhouette having a 2D skeleton as illustrated in FIG. 17A. For this, with respect to each point of the 3D skeleton, a section edge may be transformed into 3D skeleton points on a screen plane, and may be scaled using a perspective transformation, for example. Here, intermediate points of the 3D skeleton points may be interpolated, and the interpolated 3D skeleton points may be projected again on the screen plane, and sections extending over the silhouette may be cut off. In this way, the 3D section may be formed as illustrated in FIG. 17B. FIG. 17C illustrates a 3D skeleton having 3D sections calculated in different camera positions.

Figure 18:
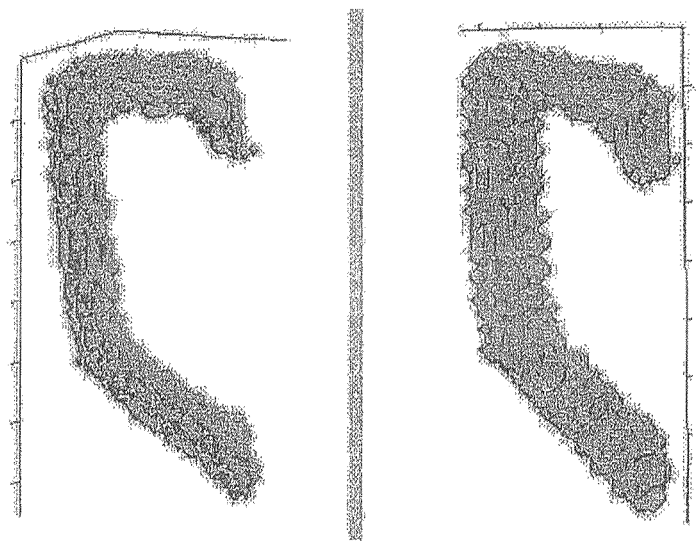
FIG. 18 illustrates a 3D volume model of the 3D skeleton illustrated in FIG. 17C.
Figure 19:
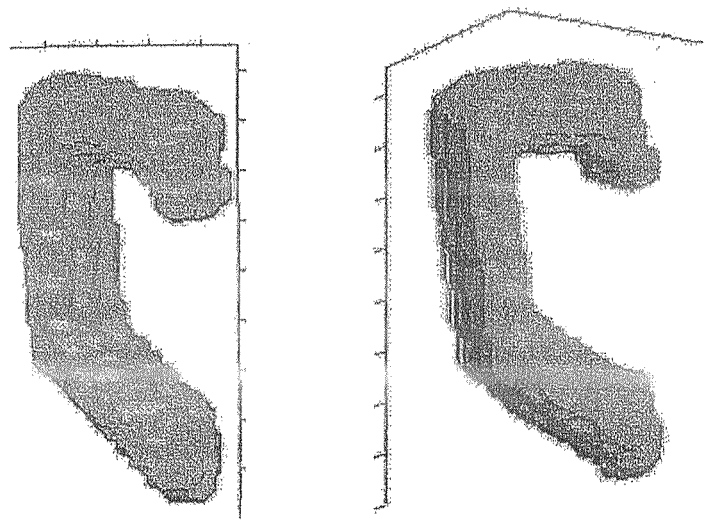
FIG. 19 illustrates an example in which a Gauss filter is used on the 3D volume model illustrated in FIG. 18.

In operation 113 of the method illustrated in FIG. 11, a 3D volume model with respect to the 3D skeleton may be constructed as illustrated in FIG. 18. For this, the coordinates of the 3D skeleton may be transformed to fit a predetermined voxel space, and sections may be generated for a 3D volume construction. The sections may be generated at two points of each 3D skeleton edge and between the two points. In order to make a continuous model, intermediate points may be calculated and a selected section shape may be adjusted to satisfy cross-section area constraints. In order to smooth the generated 3D volume, a Gauss filter may be used. FIG. 19 illustrates an example in which a Gauss filter is used on the 3D volume.

After smoothing the 3D volume, the volume surface extending over the silhouette as illustrated in FIG. 20A may be cut off as illustrated in FIG. 20B. The number of the cut external surfaces is determined according to the size of a smoothing filter.

In order to obtain a high quality model, the 3D volume may be corrected using a visual hull of the input silhouette by projecting each voxel of the model on the silhouette. FIG. 21 illustrates a corrected result.

After the 3D volume is constructed, 3D polygons may be formed in operation 114 of the method illustrated in FIG. 11. An iso-surface may be constructed using a known edge-based algorithm, and a 3D polygon model may be generated by inverse transforming the 3D skeleton coordinates, for example, which were transformed in order to generate the 3D volume model. In order to reduce artifacts in rendering, the number of triangles in the 3D polygon model as illustrated in FIG. 22A may be reduced as illustrated in FIG. 22B. Then, by iteratively applying a Laplacian flow mesh filter, for example, the 3D polygon model may be smoothed as illustrated in FIG. 23.

Figure 24:
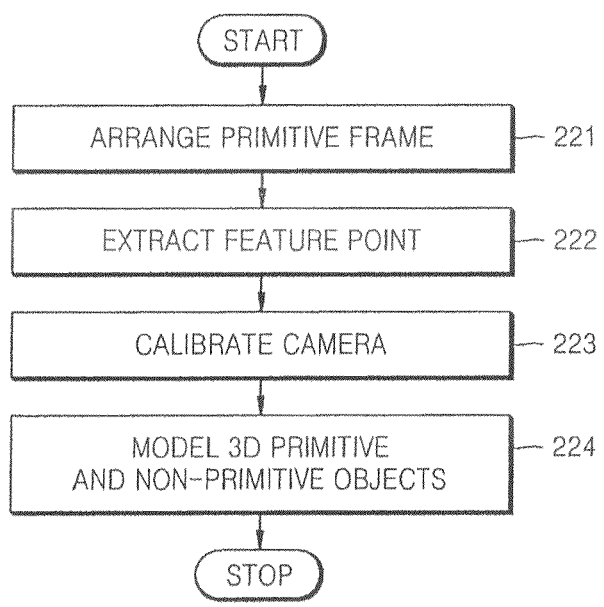
FIG. 24 is a flowchart of a method of reconstructing an image for 3D navigation, according to an embodiment of the present invention.

The present invention may also be applied to 3D navigation. FIG. 24 is a flowchart of a method of reconstructing an image for 3D navigation according to an embodiment of the present invention. First, a reference object with respect to two input images may be determined and then, a primitive frame, such as a hexahedron, may be disposed in the reference object in operation 221. FIG. 25 illustrates an example of a roadside building scene. FIGS. 26A and 26B illustrate scenes of different views according to the orientation of a camera 240. FIG. 26A illustrates an example in which a building is covered with a hexahedron 241.

Using corner points of the hexahedron covering the building, feature points are extracted from the two images in operation 222. Using the extracted feature points, the camera is calibrated and thus 3D points, and intrinsic and extrinsic camera calibration information may be obtained from the images in operation 223. Here, the calibration of the camera may be performed according to the camera calibration method illustrated in FIG. 1 or by using the conventional checker board as a calibration tool, for example.

Next, using the 3D points and intrinsic and extrinsic camera calibration information, 3D primitive object, and non-primitive objects, e.g., the building or the terrain feature, may be modeled according to the method of reconstructing an image illustrated in FIG. 8 in operation 224.

In addition to this discussion, one or more embodiments of the present invention may also be implemented through such software as computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to one or more embodiments of the present invention. The media may also be a distributed network, so that the computer readable code is stored/transferred and executed in a distributed fashion. Still further, as only an example, the processing element may include a processor or a computer processor, and processing elements may be distributed and/or included in a single device.

According to one or more embodiments of the present invention, a camera may be calibrated using relations between points in images in sequential input images without using a calibration tool. Also, primitive objects may be modelled using data obtained as a result of the camera calibration and non-primitive objects may be modelled through sketch-based editing.

One or more embodiments of the present invention may also be applied to telematics finding a path to a destination using modelling of buildings and terrain feature, and to 3D virtual shopping, virtual reality and virtual experience programs, for example. Also, since modelling of surrounding environments may be enabled, one or more embodiments of the present invention may also be applied to 3D simulation games and the like.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of calibrating a camera, the method comprising:
setting a feature track by tracking and matching features in an input image sequence, wherein the tracking and matching of the features comprises;
detecting a feature point of a first frame of the input image sequence;
predicting a feature point position in a next frame corresponding to the detected feature point of the first frame, wherein the predicting of the feature point position is performed hierarchically by generating images of a plurality of resolution levels and predicting the feature of the next frame by beginning from a lower resolution level and increasing sequentially to higher resolution levels; and
matching feature points in the next frame based on the predicting of the feature point positions in the next frame;
estimating 3-dimensional (3D) points in relation to the matched feature points by initializing a structure and motion of the camera;
estimating a pose of the camera using the 3D points and refining the structure of the camera based on the estimated pose; and
refining the pose of the camera.

2. The method of claim 1, wherein the tracking and matching of the features further comprises:
searching the features in a window centered at the predicted feature position.

3. The method of claim 2, wherein the predicted feature position is further adjusted by calculating a difference between a window centering at the feature point of the current frame and a window centering at the predicted feature position in the next frame, and shifting the predicted feature position in a direction of a gradient between the current and the next frame, reflecting the calculated difference.

4. The method of claim 2, wherein the matching the searched features comprises:
calculating correspondence between the feature point of the current frame and the searched features in the next frame;
selecting features in which the correspondence exceeds a threshold; and
estimating projectivity of the feature point of the current frame to the selected features and selecting a most similar feature among the selected features.

5. The method of claim 2, further comprising:
if the feature is not searched in the searching features in a window, using the predicted feature position as a new tracking position of the next frame; and
if the feature is not searched in continuous frames, determining the feature as an outlier and removing the feature.

6. The method of claim 1, wherein the estimating a pose of the camera comprises:
projecting the 3D points on a 2-dimensional (2D) plane through a camera projection matrix;
weighting distances between the projected points and feature points obtained from a next frame, based on a camera angle with respect to the 3D points; and obtaining the camera projection matrix minimizing the weighted distances.

7. The method of claim 6, wherein a weight is determined according to an equation below:

$$w = \min(a, \pi/2) * \log(n), \quad a = \begin{cases} a, & a <= \pi/2 \\ \pi/2 - a, & a > \pi/2 \end{cases}$$

Where w us a weighting factor and a is an angle between a line connecting a center of the camera and a 3D point and a center line of the camera and n is a number of cameras.

8. A method of reconstructing a 3-dimensional (3D) object, the method comprising:
   calibrating a camera using feature points in an input image sequence by detecting a feature point of a first frame in the input image sequence, predicting a feature point position in a next frame of the input image sequence corresponding to a detected feature point of the first frame, wherein the predicting of the feature point position is performed hierarchically by generating images of a plurality of resolution levels and predicting the feature of the next frame beginning from a lower resolution level and increasing gradually to higher resolution levels, matching feature points in the next frame based on the predicting of the feature point positions in the next frame, and obtaining 3D points with respect to the matched feature points by initializing a structure and motion of the camera;
   obtaining an outermost surface with respect to an object from two frames among input images, and dividing 3D points belonging to the outermost surface from the 3D points;
   modeling primitive objects included in the input images from the divided 3D points; and
   receiving outline information on non-primitive objects through user interaction, and modeling the non-primitive objects from the input images.

9. The method of claim 8, wherein the modeling primitive objects comprises:
   selecting one of the divided 3D points as an origin;
   selecting a set of neighboring points centering at the origin;
   obtaining an approximating plane corresponding to the neighboring point set;
   performing initial modeling of the primitive objects from a plurality of approximating planes obtained by repeating the selecting one of the divided 3D points as an origin through the obtaining an approximating plane; and
   fitting the divided 3D points to the result of the performing initial modeling.

10. The method of claim 9, wherein the neighboring point set comprises N 3D points closest to the origin in a predetermined distance from the origin.

11. The method of claim 9, wherein the obtaining of the approximating plane comprises:
   calculating a neighboring quality measure with respect to the 3D points belonging to the neighboring point set using a model parameter estimation method; and
   obtaining the approximating plane by obtaining a normal vector of the approximating plane, if the neighboring quality measure is greater than a threshold.

12. The method of claim 8, wherein the modeling of the non-primitive objects comprises:
   receiving outline points from a silhouette of each of the non-primitive objects desired to be modeled from the input image sequence,
   extracting 2D skeletons with respect to the silhouette by using triangulation based on the received outline points;
   obtaining an outermost surface of a 3D object from the 2D skeletons and constructing a 3D skeleton by calculating 3D sections from the outermost surface;
   generating a volume model by performing a transform of the 3D skeleton into a voxel space; and
   constructing a 3D polygon model by performing the transform inversely for the volume model.

13. The method of claim 12, wherein the outline points are positioned at inflection points of the silhouette.

14. The method of claim 12, wherein the extracting of the 2D skeletons comprises:
   forming triangle models with respect to the silhouette by using triangulation;
   obtaining edges inside polygons formed by the triangle models; and
   forming the 2D skeletons by classifying the edges for each type and by connecting the classified edges to each other according to the type to make a path.

15. The method of claim 12, wherein the constructing of the 3D skeleton comprises:
   obtaining the outermost surface of the 3D object from the 2D skeletons to transform the silhouette having the 2D skeletons into 3D skeleton points in a screen plane;
   scaling the 3D skeleton points through a perspective transformation; and
   projecting the scaled 3D skeleton points on the screen plane.

16. The method of claim 12, wherein the constructing of the 3D polygon model further comprises smoothing the polygon model by repeatedly applying a Laplacian flow mesh filter.

17. The method of claim 8, wherein the calibrating of the camera comprises:
   setting a feature track by tracking and matching features from the input image sequence;
   estimating 3D points with respect to the features by initializing a structure and motion of the camera;
   estimating a pose of the camera by using 3D points and refining the structure of the camera based on the estimated pose; and
   refining the pose of the camera.

18. The method of claim 17, wherein the tracking and matching features further comprises:
   searching the features in a window centered at the predicted feature position.

19. The method of claim 17, wherein the estimating of the pose of the camera comprises:
   projecting the 3D points on a 2D plane through a camera projection matrix;
   weighting distances between the projected points and the feature points obtained from the next frame, based on a camera angle with respect to the 3D points; and
   obtaining the camera projection matrix minimizing the weighted distances.

20. The method of claim 19, wherein a weight is determined according to an equation below:

$$w = \min(a, \pi/2) * \log(n), \quad a = \begin{cases} a, & a <= \pi/2 \\ \pi/2 - a, & a > \pi/2 \end{cases}$$

Where w is a weighting factor and a is an angle between a line connecting a center of the camera and a 3D point and a center line of the camera and n is a number of cameras.

21. A method of reconstructing a non-primitive 3-dimensional (3D) object, the method comprising:
- receiving outline points of a 2-dimensional (2D) silhouette of the non-primitive object desired to be modeled in an input image sequence, wherein the outline points include points that have been selected because they are positioned at inflection points of the silhouette thereby minimizing a quantity of selected outline points;
- extracting 2D skeletons with respect to the 2D silhouette by using triangulation based on the received outline points;
- obtaining an outermost surface of a 3D object from the 2D skeletons and constructing a 3D skeleton by calculating 3D sections from the outermost surface;
- generating a volume model by performing a transform of the 3D skeleton into a voxel space; and
- constructing a 3D polygon model by performing the transform inversely for the volume model.

22. The method of claim 21, wherein the extracting of the 2D skeletons comprises:
- forming triangle models with respect to the silhouette using triangulation;
- obtaining edges inside polygons formed by the triangle models; and
- forming the 2D skeletons by classifying the edges for each type and by connecting the classified edges to each other according to the type to make a path.

23. The method of claim 21, wherein the constructing of the 3D skeleton comprises:
- obtaining the outermost surface of the 3D object from the 2D skeletons to transform the silhouette having the 2D skeletons into 3D skeleton points in a screen plane;
- scaling the 3D skeleton points through a perspective transformation; and
- projecting the scaled 3D skeleton points on the screen plane.

24. The method of claim 21, wherein the constructing of the 3D polygon model further comprises smoothing the 3D polygon model by repeatedly applying a Laplacian mesh filter.

25. A method of reconstructing a 3-dimensional (3D) object at a roadside, comprising:
- arranging a hexahedron with respect to an identical and primitive object in two images of the roadside viewed from different camera orientations, respectively;
- extracting feature points with respect to the hexahedron;
- calibrating the camera using the feature points and obtaining 3D points for the images;
- modeling the primitive object from the 3D points; and
- receiving outline information of a non-primitive object through user interaction and modeling the non-primitive object from the images.

26. At least one non-transitory medium comprising computer readable code to control at least one processing element in a computer to implement a method of calibrating a camera, the method comprising:
- setting a feature track by tracking and matching features in an input image sequence, wherein the tracking and matching of the features comprises;
  - detecting a feature point of a first frame of the input image sequence;
  - predicting a feature point position in a next frame corresponding to the detected feature point of the first frame, wherein the predicting of the feature point position is performed hierarchically by generating images of a plurality of resolution levels and predicting the feature of the next frame by beginning from a lower resolution level and increasing sequentially to higher resolution levels; and
  - matching feature points in the next frame based on the predicting of the feature point positions in the next frame;
- estimating 3-dimensional (3D) points in relation to the matched feature points by initializing a structure and motion of the camera;
- estimating a pose of the camera using 3D points and refining the structure of the camera based on the estimated pose; and
- refining the pose of the camera.

27. At least one non-transitory medium comprising computer readable code to control at least one processing element in a computer to implement a method of reconstructing a 3-dimensional (3D) object, the method comprising:
- calibrating a camera using feature points in an input image sequence by detecting a feature point of a first frame in the input image sequence, predicting a feature point position in a next frame of the input image sequence corresponding to a detected feature point of the first frame, wherein the predicting of the feature point position is performed hierarchically by generating images of a plurality of resolution levels and predicting the feature of the next frame beginning from a lower resolution level and increasing gradually to higher resolution levels, matching feature points in the next frame based on the predicting of the feature point positions in the next frame, and obtaining 3D points with respect to the matched feature points by initializing a structure and motion of the camera;
- obtaining an outermost surface with respect to an object from two frames among input images, and dividing 3D points belonging to the outermost surface from the 3D points;
- modeling primitive objects included in the input images from the divided 3D points; and
- receiving outline information on a non-primitive objects through user interaction, and modeling the non-primitive objects from the input images.

28. At least one non-transitory medium comprising computer readable code to control at least one processing element in a computer to implement a method of reconstructing a non-primitive 3-dimensional (3D) object, the method comprising:
- receiving outline points of a silhouette of the non-primitive object desired to be modeled in an input image sequence, wherein the outline points include points that have been selected because they are positioned at inflection points of the silhouette thereby minimizing a quantity of selected outline points;
- extracting 2-dimensional (2D) skeletons with respect to the silhouette by using triangulation based on the received outline points;
- obtaining an outermost surface of a 3D object from the 2D skeletons and constructing a 3D skeleton by calculating 3D sections from the outermost surface;
- generating a volume model by performing a transform of the 3D skeleton into a voxel space; and
- constructing a 3D polygon model by performing the transform inversely for the volume model.

29. At least one non-transitory medium comprising computer readable code to control at least one processing element in a computer to implement a method of reconstructing a 3-dimensional (3D) object at a roadside, the method comprising:

arranging a hexahedron with respect to an identical and primitive object in two images of the roadside viewed from different camera orientations, respectively;

extracting feature points with respect to the hexahedron;

calibrating the camera using the feature points and obtaining 3D points for the images;

modeling the primitive object from the 3D points; and receiving outline information of a non-primitive object through user interaction and modeling the non-primitive object from the images.

30. A camera calibration method comprising:

detecting one or more feature points from each of a plurality of consecutive images, wherein the detecting comprises;

detecting a feature point of a first frame of the plurality of consecutive images;

predicting a feature point position in a next frame corresponding to the detected feature point of the first frame, wherein the predicting of the feature point position is performed hierarchically by generating images of a plurality of resolution levels and predicting the feature of the next frame by beginning from a lower resolution level and increasing sequentially to higher resolution levels; and matching feature points in the next frame based on the predicting of the feature point position in the next frame;

estimating 3-dimensional (3D) points in relation to the matched feature points by initializing a structure and motion of the camera;

estimating a pose of the camera using the 3D points and refining the structure of the camera based on the estimated pose; and refining the pose of the camera based on the refined structure of the camera.

31. At least one non-transitory medium comprising computer readable code to control at least one processing element to implement the method of claim 30.

* * * * *

UNITED STATES PATENT AND TRADEMARK OFFICE
CERTIFICATE OF CORRECTION

PATENT NO.        : 8,896,665 B2                                     Page 1 of 1
APPLICATION NO.   : 11/723532
DATED             : November 25, 2014
INVENTOR(S)       : Keun-ho Kim et al.

It is certified that error appears in the above-identified patent and that said Letters Patent is hereby corrected as shown below:

In the Claims

Claim 12, Column 15, Line 67:

Delete "sequence," and insert --sequence;--, thereof.

Signed and Sealed this
Thirtieth Day of June, 2015

Michelle K. Lee
*Director of the United States Patent and Trademark Office*